United States Patent [19]

VandeVelde

[11] Patent Number: 4,534,318

[45] Date of Patent: Aug. 13, 1985

[54] DEVICE FOR TYING-UP AN ANIMAL

[76] Inventor: Noël VandeVelde, Rte. de Mettet 201, B - 6838 Pavillons/Florennes, Belgium

[21] Appl. No.: 507,138

[22] Filed: Jun. 23, 1983

[30] Foreign Application Priority Data

Jun. 25, 1982 [BE] Belgium .............................. 2/59752

[51] Int. Cl.³ .............................................. A01K 1/06
[52] U.S. Cl. ................................................ 119/147 R
[58] Field of Search ................ 119/147, 148, 149, 150

[56] References Cited

U.S. PATENT DOCUMENTS 1,953,875  4/1934  Babson ................................ 119/148

FOREIGN PATENT DOCUMENTS

2830405  1/1980  Fed. Rep. of Germany ... 119/147 A
2845521  4/1980  Fed. Rep. of Germany ... 119/147 A Primary Examiner—Hugh R. Chamblee
Attorney, Agent, or Firm—Stevens, Davis, Miller & Mosher

[57] ABSTRACT

The device for tying-up an animal comprises a suspension element, a yoke and a control member. The suspension element has a base and two depending arms. The top parts of the yoke legs hinge about pins which are supported adjacent the lower ends of the arms. A control member acts on those portions of the top parts which project above the pins. Locking means connected to the control member prevent the yoke legs hinging outwards in a closing condition.

7 Claims, 12 Drawing Figures

DEVICE FOR TYING-UP AN ANIMAL

BACKGROUND

The invention relates to a device for tying-up an animal with:

a suspension element to be hung at the top to a fixed structure, a bottom piece which can be connected to the fixed structure, two legs which lie between the suspension element and the bottom piece, and which form together with the bottom piece, one yoke, which legs are each comprised of:

a top part which is hingedly secured to the suspension element about an axis which lies at right angle to the main yoke plane, and a lower part which is connected through a first hinge to the top part and through a second hinge to the bottom piece, which hinges allow a motion in the main yoke plane as well as outside thereof, locking means which prevent the legs in a closing position from hinging outwards in the yoke plane, a control member which hinges between a first position wherein it retains the top parts away from one another and closes partly the space between the top parts, and a second position wherein said member lets the top parts move to the vertical closing position thereof, and a mechanical connection between the control member and the locking means which in the first position of the control member, retains the locking means in unlocking position, and in the second position of the control member, retains the locking means in locking position.

A device of this kind is known from DE-A No. 28 45 521.

In this known device, the top parts of the yoke legs hinge with the outermost top ends thereof in a suspension element which is comprised of a section with U-shaped cross-section; the action of the control member on the top parts, the locking means and the connection between the control member and the locking means are quite intricate.

THE INVENTION

The invention has for object to provide a device of the above-defined art the composition of which is simpler than the above-defined known device, and the operation of which is also more reliable.

FURTHER BACKGROUND

To open said known device, one pulls through a shaft which lies completely above said yoke, and a cable which is connected on the one hand to said shaft, and on the other hand to this control member, along an upwardly-directed direction on this control member. By rotating the shaft, various yokes may be opened simultaneously.

THE INVENTION

The invention bases among others on the opinion that a series of yokes may be opened as quickly one by one when one lets the control member act in a simpler way on the top parts, and when for opening a downward pulling force has to be exerted on the control member instead of an upward pulling force.

FURTHER BACKGROUND

In the above-mentioned known device, the control member projects markedly above the yoke in closing position, particularly due to the control member hinging relative to the suspensionelement about a geometrical axis which lies level with the top part of the suspension element. This prevents arranging the device in stalls wherein the spacing between the top beam the suspension element is to be secured to, and the floor is too short.

THE INVENTION

An object of the invention is also to obviate this drawback and to provide a device which may be arranged where the top beam lies quite low over the ground.

An object of the invention is further to provide a device of the above kind which allows a wide opening of the yoke at a low height, while the total heigth of the yoke remains limited.

Another object of the invention is to provide a device of the above-defined art the bottom piece of which may lie low against the ground and may have a limited height.

For this purpose, the suspension element has a base and two downward-facing arms, the top parts of the yoke legs hinge about pins which are supported adjacent the lower ends of said arms of the suspension element, the top parts project above said pins, and the control member acts on those portions of the top parts which lie above the pins.

It is thus to be noted that the space between the portions of the top parts which lie above the hinge axes also leaves room for the animal neck as the device lies in closing position, which means a more rational use of the device over the whole height thereof.

FURTHER BACKGROUND

A device for tying-up an animal the suspension element of which has a base and two downward-facing arms, the top parts of the yoke legs of which hinge about pins which are supported adjacent the bottom ends of the suspension element arms, and the top parts of which project above said pins up to against the base of the suspension element, is known per se from DE-A No. 27 22 730.

This known device has however no control element the animal acts upon to cause the yoke to move from the open position to the closed position. In this known device, the closing is caused due to the animal pushing against the yoke proper, wherefor a longer length is required along the lengthwise axis of the lying-and-standing station. When using such a device also, the bait feed which is arranged in the crib at the front, has to be located further frontwards which is not always possible, for example when the crib width is too limited.

THE INVENTION

In an advantageous embodiment of the invention, the top parts project above the pins up to against the base of the suspension element and said suspension element base forms a channel wherein the uppermost ends of the leg top parts are movable. Thereby the leg top parts are guided at the top in the yoke plane, so that any play in the hinge points at the level of said pins is absorbed.

In a particular embodiment of the invention, the control member hinges relative to the suspension element about an axis in parallel relationship with the yoke plane between a first lower position and a second upper position, and the control member in the first position is directed at an angle downwards away from the suspension element.

This makes closing of the yoke by the animal easier as said animal pushes against the control element.

In another embodiment of the invention, the control member hinges relative to a locking means about an axis at right angle to the yoke plane and said locking means is comprised of a lath which is hinged relative to a top part, is provided with a projecting portion that engages the other top part, is connected by a spring to said first top part and is pulled away by said spring from said top part, and the control member engages in the yoke open position, a projection from the suspension element.

Other details and advantages of the invention will stand out from the following description of devices for tying-up an animal according to the invention; this description is only given by way of example and does not limit the invention; the reference numerals pertain to the accompanying drawings.

THE DRAWINGS

In the various figures, the same reference numerals pertain to the same elements.

THE DESCRIPTION

The device shown in FIGS. 1 to 8 for tying-up an animal, is mounted inside a fixed structure the floor 1 and the top beam 2 belong to.

This device is intended to retain a bovine inside a lying-and-standing station. The cross-wise direction of the lying-and-standing station corresponds to the direction of the top beam 2. When the bovine enters normally the lying-and-standing station, he moves along the lengthwise direction.

The device is comprised essentially of a suspension element 3-4 and a yoke, which is in turn comprised of a bottom piece 5 and two yoke legs connecting thereto, which are each comprised of a top part 6 and a lower part 7. Said parts 6 and 7 are hingedly connected together, as well as to the suspension element 3-4 and the bottom piece 5, in a way which will be further described hereinafter. At rest, said parts lie in one and the same plane, the so-called yoke plane. Independently of whether the device lies in the open position or the closed position as described hereinafter, the complete device in balance lies in any case with the yoke plane along a direction which corresponds to the cross-wise direction of the lying-and-standing station.

On the one side of the device extending at rest along the cross-wise direction of the lying-and-standing station, called hereinafter the front side, the lying-and-standing station has a crib. The other side of the device is thus called the rear side.

The complete device is made of metal.

The suspension element 3-4 is U-shaped and is comprised of a horizontal suspended base 3 and two arms 4 directed downwards, welded to the base ends. The arms 4 are round tubes. The base 3 is a channel with U-shaped cross-section, the opening of which faces downwards. Inside said channel 3 may move to-and-fro the uppermost ends of the top parts 6.

To suspend the suspension element 3-4, two small fastening clamps 8 are arranged about the top beam 2 on which they are retained by screw-bolts 9 with nuts. Two eyelets 10 which are welded to the upper surface of base 3 are hung through chains 11, to hooks which are in turn fast to the lower side of said small fastening clamps 8. The base 3 thus extends in parallel relationship with the top beam 2.

As the chains 11 are flexible suspension elements, they try under the action of the weight of suspension element 3-4, and everything that hangs therefrom to take that position where the center lines thereof lie in parallel relationship with one another. At rest, said center lines define a vertical plane which extends in parallel relationslip with said top beam 2, that is along the cross-wise direction of the lying-and-standing station. It will be clear from the preceding description that the top parts 6 of the yoke legs also lie in a vertical cross-wise plane when the suspension element 3-4 extends in such a plane.

Under the action of the animal, the yoke and thus the top parts 6 and the suspension element 3-4 are moved out of the cross-wise plane, but as soon as the force of gravity may play freely, the yoke will return in the cross-wise plane.

The bottom piece 5 is a round tube which extends in parallel relationship with the floor 1. An eyelet 12 which is welded at the bottom on the bottom piece, is connected through a chain 13, to an eyelet 14 which is fitted in the floor 1 of the fixed structure.

Figure 1:
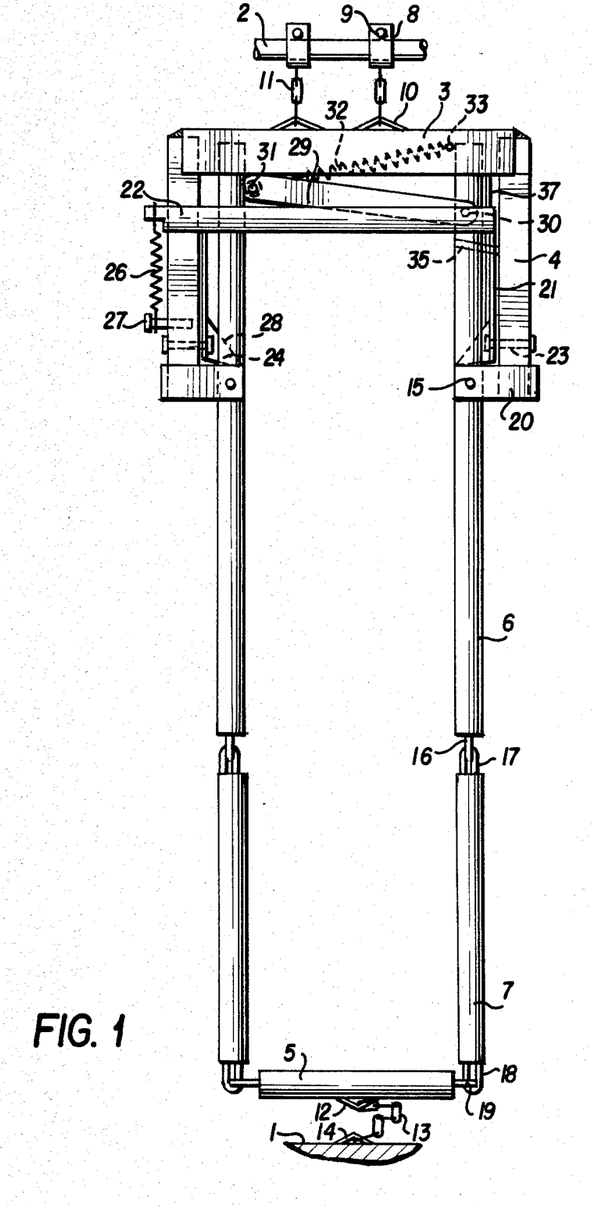
FIG. 1 is a front view of a device for tying-up an animal according to the invention, whereby the yoke is shown in closed position.
Figure 2:
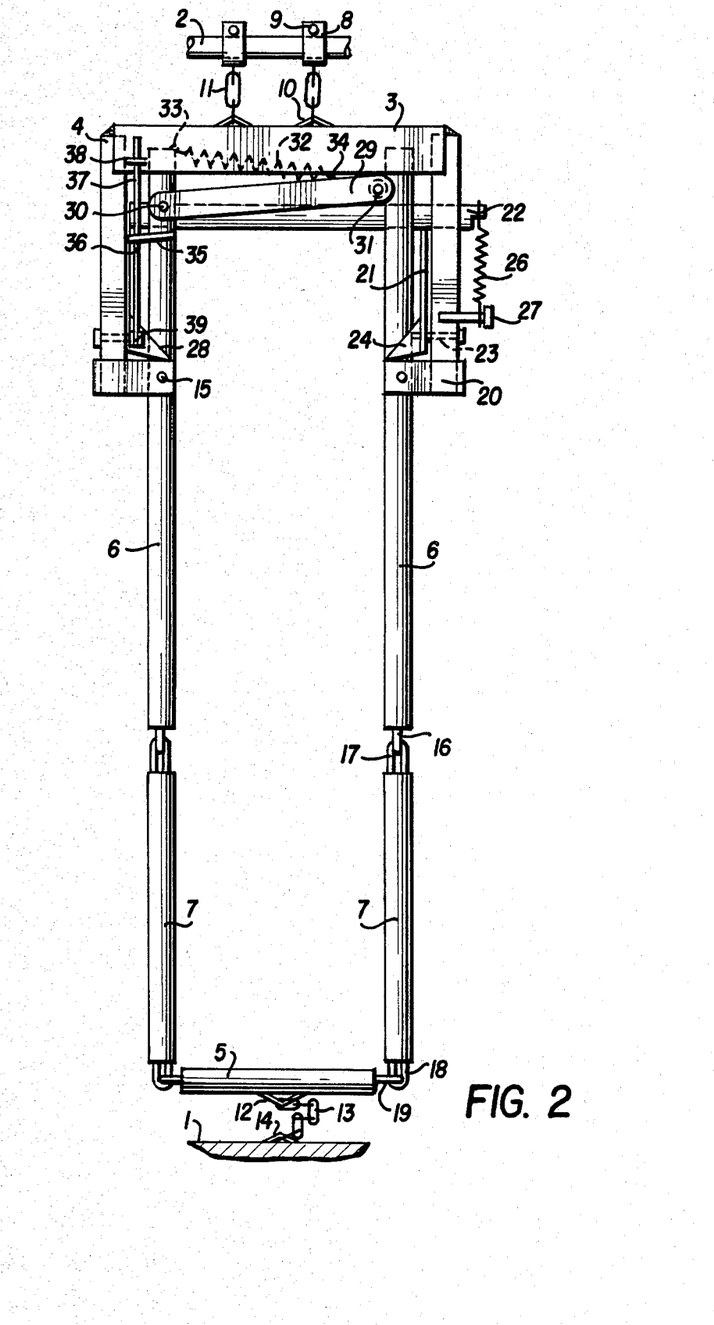
FIG. 2 is a rear view of the device shown in FIG. 1.
Figure 3:
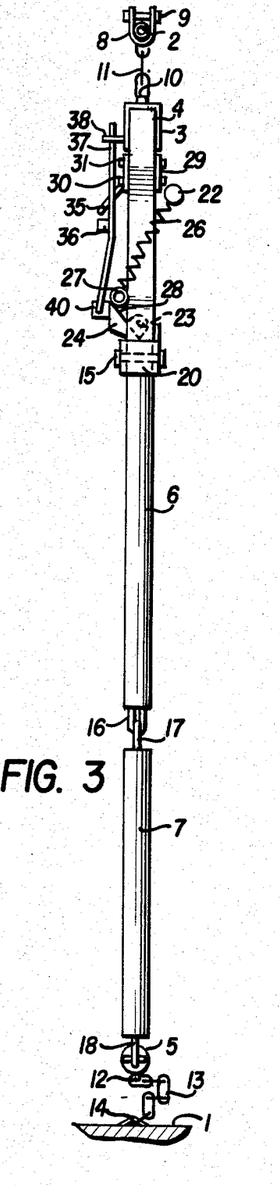
FIG. 3 is a side view of the device as shown in the preceding figures.
Figure 4:
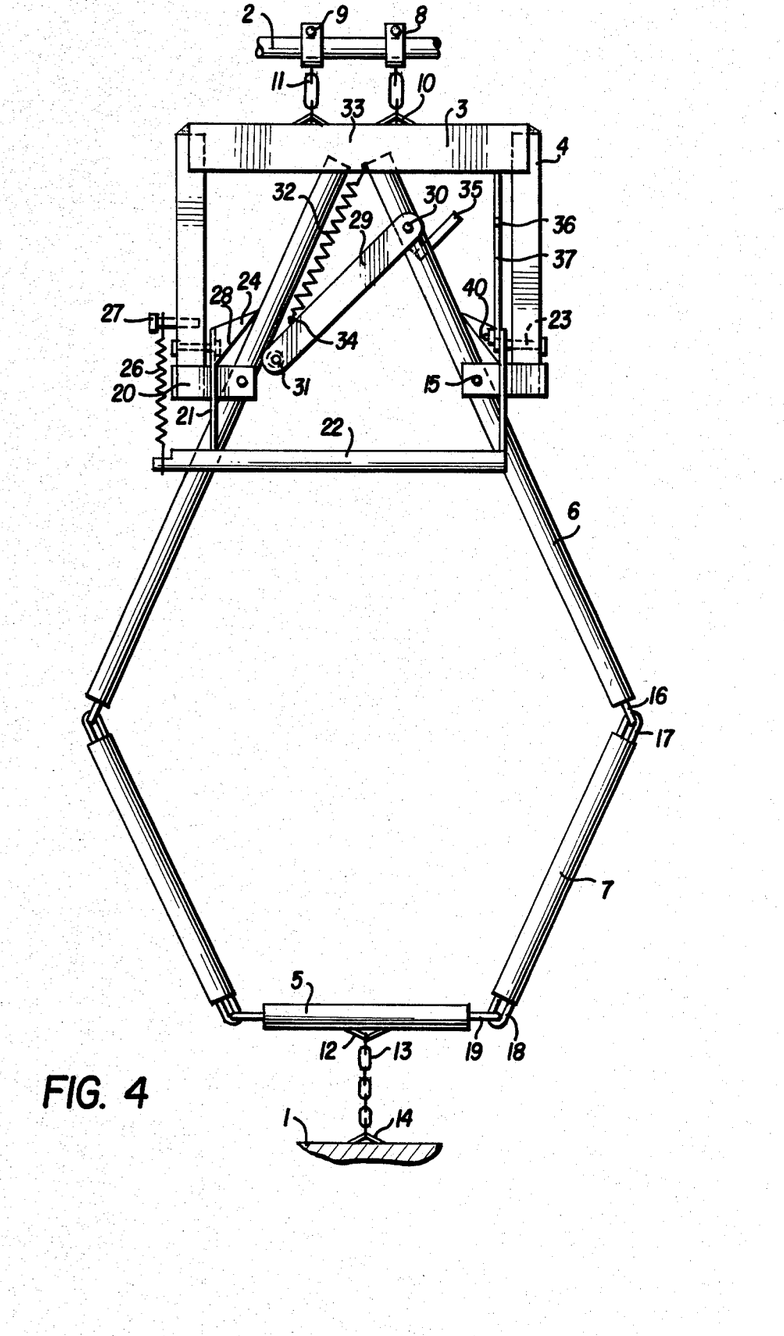
FIG. 4 is a front view of the device as shown in the preceding figures, but whereby the yoke is shown in open position.
Figure 5:
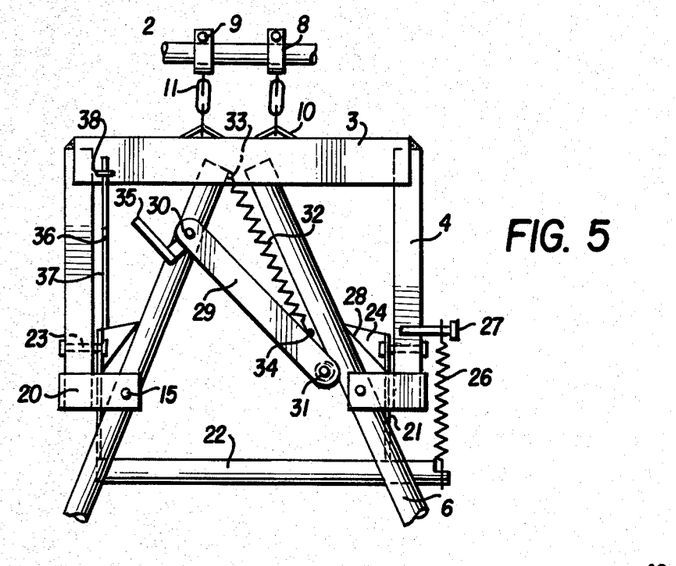
FIG. 5 is a rear view of part of the device as shown in the preceding figures, in the open position of FIG. 4.
Figure 6:
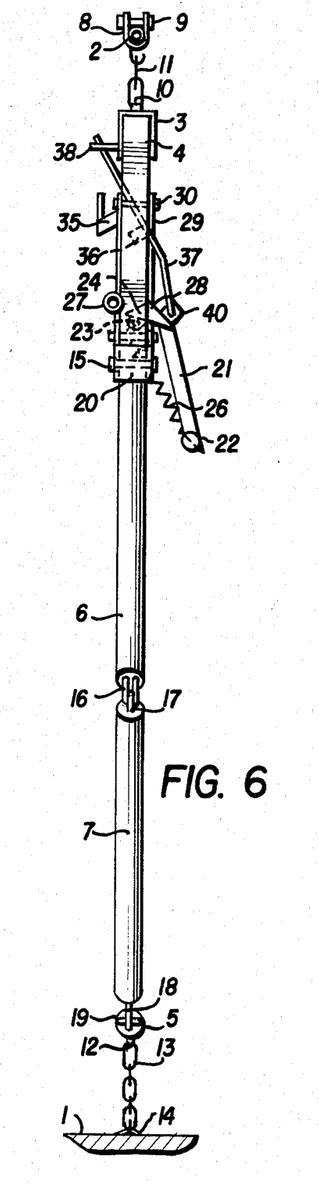
FIG. 6 is a side view of the device as shown in the preceding figures, whereby the yoke is shown in the open position of FIGS. 4 and 5.
Figure 7:
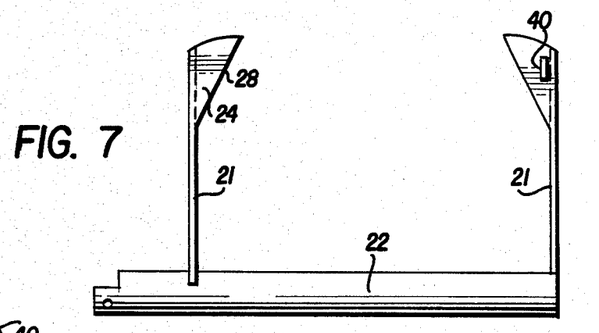
FIG. 7 is a front view of the control yoke of the device as shown in the preceding figures, but drawn on larger scale.
Figure 8:
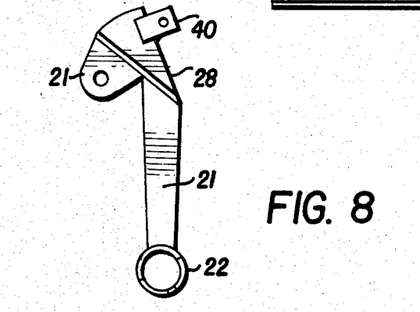
FIG. 8 is a side view of the control yoke as shown in FIG. 7.

The device is thus mounted between the top beam 2 and floor 1 through chains 11 and 13. When the device takes the closed position as shown in FIGS. 1 to 3, the chain 13 hangs loose, which makes possible for the animal to move within some limits. When to the contrary, the device takes the open position as shown in FIGS. 4 to 6, the chain is less loose or taut.

To each arm 4 of the suspension element 3-4 is welded a fastening clamp 20. Said fastening clamps 20 face one another with the open side thereof, and bear a pin 15 on the sides facing one another. The cheeks of the fastening clamps 20 are vertical and lie in parallel relationship with the top beam 2. The pins 15 lie at right angle to said cheeks. About each pin 15 hinges one top part 6 of a yoke leg. The top parts 6 project above the pins 15 over a length which is somewhat shorter than the length of an arm 4; the top ends of said top parts 6 thus lie inside the channel 3 wherein they are movable to-and-fro as the top parts 6 swing about the pins 15.

When the top parts 6 hang freely from the pins 15, they lie in parallel relationship with one another. They take such a position when the yoke is in closed position; the top parts are then locked relative to one another, as it appears from the following description.

Said directions of the various eyelets which connect together the yoke parts relate to that position of the yoke parts when the suspension element 3-4, the yoke legs 6-7, and the bottom piece 5 lie in one and the same plane, that is the yoke plane, and the top parts 6 as well as the bottom parts 7 lie in paralel relationship with one another.

The top parts 6 and the bottom parts 7 are round tubes. On the lower ends thereof, the top parts 6 bear eyelets 16 at right angle to the yoke plane.

The bottom parts 7 bear on the uppermost ends thereof eyelets 17 which lie in parallel relationship with the yoke plane and which are engaged in the eyelets 16 of the top parts 6.

On the lowermost ends thereof, the bottom parts 7 bear eyelets 18 which also lie in parallel relationship with the yoke plane. Said eyelets 18 are engaged in eyelets 19 which are arranged on the ends of the connecting leg 5. Said eyelets 19 are horizontal and at right angle to the yoke plane.

Said eyelets 16,17 and 18,19 form hinges which allow a movement of the connected parts relative to one another, both in the yoke plane and outside said plane. Both yoke legs 6-7 may thus take the open position of the yoke as shown in FIGS. 4 to 6, and the closing position thereof as shown in FIGS. 1 to 3. In the closed position of the yoke as shown in FIGS. 1 to 3, the chain 13 hangs loose and the yoke legs 6-7 may bend at the level of hinges 16-17, both to the front and to the back. This is not prevented: neither at the top where the suspension element 3-4 which hangs from the chains 11 may swing along, nor at the bottom where the chain 13 and the hinges 18-19 allow such motion. The hinges 16-17 also allow a slight rotating about the axis of the bottom parts 7 relative to the top parts 6. There results from all this that a bovine which is tied-up by the yoke in closed position, still has a relatively large movement freedom.

Opening and closing of the above-described yoke 5-6-7 is controlled by a control yoke or member 21-22 which is operated either by a bovine, or by man.

Said control yoke 21-22 is comprised of two parallel and symmetrically-shaped legs 21 and a connecting tube 22 which connects together the ends of both legs 21.

The other ends of said legs 21 are hingedly connected by means of pins 23 directly above the small fastening clamps 20, to the arms 4 of the suspension element 3-4. The pins 23 form hinge axes which extend in parallel relationship with the base 3 in the yoke plane. The legs 21 lie on the inner sides of arms 4, between one arm 4 and the uppermost end of a top part 6 hingedly connected to said arm 4. Both legs 21 are provided some distance away from the pins 23, with bosses 24 facing one another. Said bosses 24 co-operate with both top parts 6 and contact during a swinging of the control yoke 21-22, the uppermost ends of said top parts 6.

Each leg 21 is comprised of two flat pieces which extend in a plane at right angle to the pin 23 and the lengthwise directions of which form an angle. In the location of the angle, the triangular boss 24 lies at an angle to the plane of the flat pieces 21. The bosses 24 have ribs 28 which run at an angle relative to the lengthwise symmetry plane of the lying station and converge away from the connecting tube 22 towards the uppermost ends of the corresponding top parts 6. The control yoke 21-22 extends mainly on the front side of yoke 5-6-7, that is on that side facing the crib, of the yoke.

The control yoke 21-22 hinges about pins 23 between an operating position and a rest position.

The rest position of the control yoke 21-22 corresponds to the closing position of the yoke 5-6-7, that is to that position shown in FIGS. 1 to 3.

In such rest position, the control yoke 21-22 is directed with the legs 21 thereof at an angle upwards. The connecting tube 22 lies then on the device front side against one of the hereafter-described laths 29 which hinge about a top part 6, while the bosses 24 are located completely behind the top parts 6 and leave said top parts 6 completely free. These top parts 6 and thus the legs 6-7 of the yoke then hang automatically under the action of the force of gravity in vertical position, whereby thus the yoke 5-6-7 is in closed position. As described hereinafter, the top parts 6 are locked in this position.

By swinging from the above-defined position as shown in FIGS. 1 to 3, the control yoke 21-22 downwards, to the position shown in FIGS. 4 to 6, the bosses 24 contact with the converging ribs 28 thereof, the uppermost ends of the top parts 6. As the control yoke 21-22 comes with the connecting rod 22 thereof lower, the bosses 24 contact the top parts 6 and the contact points between the bosses 24 and the top parts 6 come nearer one another, in such a way that those portions of the top parts 6 located above the pins 15 are pushed towards one another. Consequently, the top parts 6 swing away from one another below the pins 15 and the yoke 5-6-7 moves to the open position thereof.

When the control yoke 21-22 has reached the operating position thereof shown in FIGS. 4 to 6, the yoke 5-6-7 lies in completely open position, and the control yoke 21-22 is directed at an angle downwards. The control yoke 21-22 then partly closes the opening of yoke 5-6-7.

A spiral spring 26 is secured with the one end thereof to a pin 27 which is fixedly welded somewhat above the hinge pin 23, to the one arm 4. The other end of spring 26 is fast to the one end of the connecting tube 22 which projects on the one side outside the yoke 5-6-7, the suspension element 3-4 and the remaining portion of control yoke 21-22. In every position of the control yoke 21-22, the spring 26 lies under tension strain.

In the operating position of control yoke 21-22, that is in open position of the yoke 5-6-7, the geometrical lengthwise axis of spring 26 passes below the hinge pins 23, as it appears mostly from FIG. 6. In this position, the spring 26 retains the control yoke 21-22 in operating condition and consequently also the yoke 5-6-7 in open position.

In the rest position of control yoke 21-22, thus in closed position of yoke 5-6-7, the geometrical lengtwhise axis of spring 26 passes above the hinge pins 23, as it appears mostly from FIG. 3. In this position, the spring 26 retains the control yoke 21-22 in rest position and consequently also the yoke 5-6-7 in closed position.

When the control yoke 21-22 moves from the operating condition to the rest condition or vice-versa from the rest condition to the operating condition, the geometrical lengthwise axis of spring 26 passes through pin 23. In such intermediate position, the so-called dead position, the spring 26 pulls the control yoke 21-22 neither to the operating position, nor to the rest position. As soon as the geometrical lengthwise axis of spring comes below respectively above the pin 23, said spring 26 pulls the control yoke towards the operating position or respectively towards the rest position, which brings yoke 5-6-7 to the open position or respectively to the closed position.

The device is further provided with a locking mechanism which locks the yoke in the closed position as shown in FIGS. 1 to 3.

Said mechanism comprises two laths 29 which hinge in front and in back of the top end of a top part 6, about a pin 30 which lies at right angle to the yoke plane. Between those ends thereof removed from pin 30 the laths bear a small wheel 31 which runs on the other top part 6.

A draw spring 32 is connected on the one hand to an eyelet 33 on the upper end of the top part 6 wherein pin 30 is mounted, and on the other end to a stud 34. Said stud 34 is mounted adjacent the small wheel 31 between the laths 29. Adjacent pin 30, that lath 29 which lies on the rear side bears a projection 35 which engages in the rest position of control yoke 21-22, a small buffer 36 which is fast to a small rod 37.

Said small rod 37 is guided with some play inside an eyelet 38 which lies on the rear side of suspension element base 3. The rod 37 has a bent end 39 which enters an opening which is provided therefor in a projecting portion 40 from the one leg 21 of said control yoke 21-22. The bent end 39 of rod 37 is horizontal and in parallel relationship with the yoke plane, in such a way that the small rod 37 thus hinges in a vertical plane at right angle to the yoke plane.

In closing position of the yoke 5-6-7, that is in rest position of control yoke 21-22, opening of the yoke is prevented even when the animal were to try pushing away from one another the top parts 6 below the pins 15. The laths 29 do indeed press with the small wheel 31 against a top part 6 and are connected with the pin 30 to the other top part 6.

Those ends of the laths 29 between which the small wheel 31 is mounted, then lie higher than pin 30, but cannot move further upwards as said ends engage the lower edges of base 3. An opening motion of the top parts 6 below pins 15 necessarily causes those portions of top parts 6 above pins 15 to come closer to one another, which is impossible as this would necessarily go together with an upwards movement of the laths 29 at the level of small wheel 31, which is prevented due to the laths 29 engaging the lower edge of base 3.

When however the control yoke 21-22 is pulled downwards with the connecting tube 22, during the swinging motion of said control yoke the projecting portion 40 first moves upwards, which also moves the small rod 37 upwards together with the buffer 36 and thus the projection 35 is pushed upwards. Thereby a swinging motion is imparted to the laths 29 about the pin 30, so that the small wheel 31 comes lower than pin 30 and a further opening motion of the top parts 6 below the pins 15 and thus a movement closer to one another of the top parts 6 above said pins become possible, because during such further movement, the laths 29 hinge about pin 30 to the position as shown in FIGS. 4 and 5.

The small wheel 31 rolls thereby on the top part 6. The lowering motion of the laths 29 down to the horizontal position thereof, first brings those portions of top parts 6 above pins 15 somewhat further away from one another, but this is possible due to top parts 6 hanging vertically in closed position and not engaging the inner surfaces of arms 4 of the suspension element 3-4, and at the beginning of the downwards swinging motion of the control yoke 21-22, the bosses 24 do not yet act upon the top parts 6. The unlocking thus precedes the opening of yoke 5-6-7.

During the upwards movement of control yoke 21-22 from the open position as shown in FIGS. 4 to 6, of yoke 5-6-7, to the closed position as shown in FIGS. 1 to 3, the laths 29 are pulled to the locking position thereof by spring 32 and the small rod 37 is brought to the corresponding position by projection 40 from control yoke 21-22.

An animal entering the lying-and-standing station finds the yoke 5-6-7 in the open position as snown in FIGS. 4 to 6. He passes his head through the opening which is left free between yoke legs 6-7 to eat from the crib. He pushes thereby with his neck against the connecting tube 22 of the control yoke 21-22, which is moved upwards with a swinging motion. Spring 26 comes thereby very fast to beyond the above-described dead position thereof, which causes the further upwards movement of control yoke 21-22, the further closing of yoke 5-6-7, and the locking of laths 29 in the uppermost position thereof.

As in the rest position of control yoke 21-22, the spring 26 is still under tension strain, said spring 26 holds the control yoke 21-22 in such rest position. The control yoke 21-22 may be returned against the action of spring 26, by man to the operating position thereof.

To open yoke 5-6-7, it is only necessary to pull downwards by hand the control yoke 21-22, which first causes with buffer 36, the unlocking and thereafter with the bosses 24, the opening of yoke 5-6-7.

The structure of the device is quite simple. Little space of the opening of yoke 5-6-7 is lost at least in closing position, due to the control or locking means, and the total height of the device is relatively low. The operation is very reliable.

In the devices as shown in FIGS. 9 to 12, the yoke proper with the yoke legs 6-7, the bottom piece 5, the hinges 16-17, 18-19, the hinged suspension of top parts 6 by means of the pins 15 relative to the suspension element 3-4, and the connections of bottom piece 5 and base 3 of the suspension element to the fixed structure, do not differ from the corresponding components in the device as shown in FIGS. 1 to 8.

For clearness' sake also, but one top part of a yoke leg has been shown with reference numeral 6, and in these figures the top part of the other yoke leg is designated by reference numeral 25.

Figure 9:
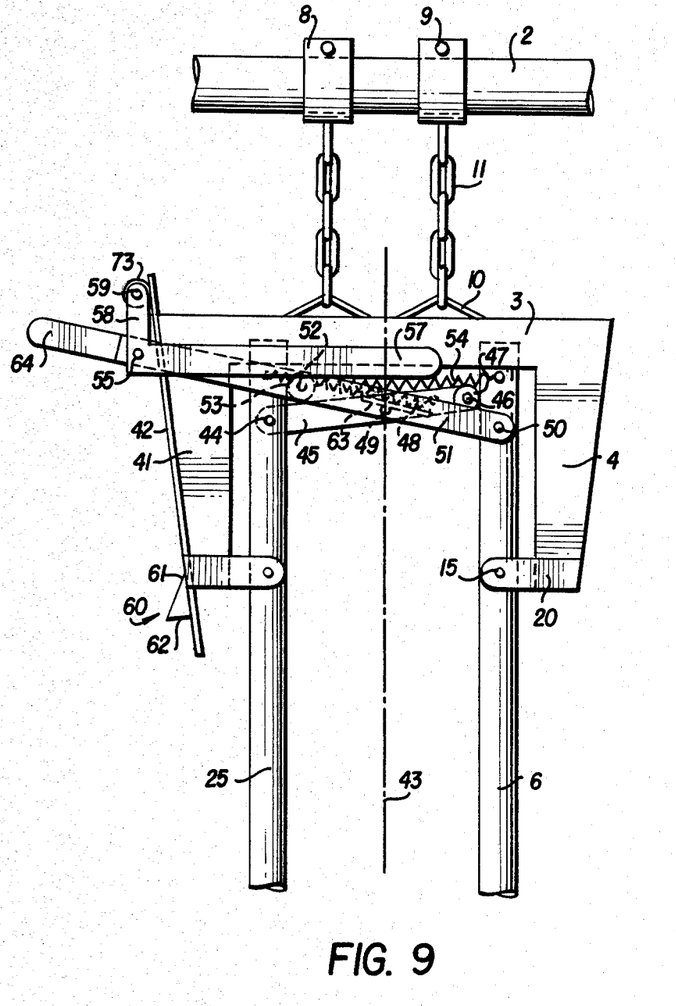
FIG. 9 is a front view of part of a second device for tying-up an animal according to the invention, whereby the yoke is shown in closed position.
Figure 10:
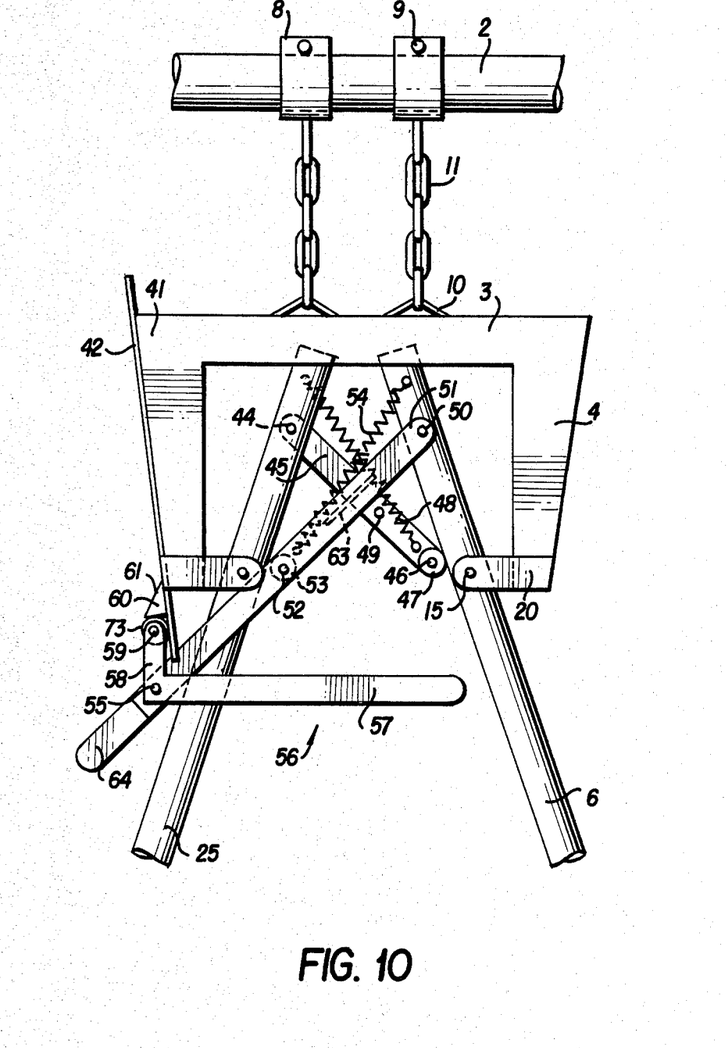
FIG. 10 is a front view of the part shown in FIG. 9, whereby the yoke is shown in open position.

The suspension element in the embodiment as shown in FIGS. 9 and 10 comprises a base 3 which corresponds to the base of the suspension element in the embodiment as shown in FIGS. 1 to 8, and two downwards directed arms 4 and 41. The arms 4 and 41 have a U-shaped cross-section, and their open sides face one another. At the top the arms 4 and 41 are welded to the channel-forming base 3 with which they form a unit. Two small plates 20 are welded to the bottom ends of arms 4 and 41. The small plates 20 lie in parallel relationship with the yoke plane and bear the hinge-pins 15 of the top parts 6 and 25.

The U-shaped horizontal cross-sections of arms 4 and 41 decrease along the cross-wise direction of the yoke, that is the cross-wise direction of the lying-and-standing station, from top to bottom. Arms 4 and 41 thus have an outer surface 42 which lies further away from the device vertical lengthwise symmetry plane 43 at the top than at the bottom.

Adjacent the upper end thereof, the top part 25 bears a horizontal pin 44 projecting backwards, about which hinges a lath 45. Said lath thus lies behind top part 25. The lath bears a small shaft 46 projecting frontwards, whereon a small wheel 47 is mounted. Said small wheel 47 engages yoke leg 6. A draw spring 48 connects lath 45 to the top end of top part 25 and thus pulls lath 45 to such a position that the small wheel 47 engages said top part 6. The lath 45 also bears a stud 49 projecting frontwards.

Adjacent the upper end thereof, the top part 6 bears a pin 50 projecting frontwards, about which hinges a lath 51. Said lath 51 is markedly longer than lath 45, lies on the front side of top part 6, but extends also up to in front of top part 25. The lath 51 bears a small shaft 52 extending to the rearside, around which lies a small wheel 53. Said wheel 53 engages arm 25. A draw spring 54 connects lath 51 to the upper end of top part 6, in such a way that said lath 51 is pulled upwards and the small wheel 53 engages the top part 25.

In a location which lies further away from pin 50 than small shaft 52, said lath 51 further bears a pin 55 projecting frontwards, about which hinges the control member 56. Said control member 56 thus lies in front of the lath 51 and consequently also of the top part 25, and said member has a substantially horizontal portion 57 and a substantially vertical portion 58. At the upper end thereof, the substantially vertical portion 58 of control member 56 bears a small shaft 59 directed backwards. A small wheel 73 lies around small shaft 59. Said small wheel 73 engages the outer surface 42 of arm 41 of the suspension element. That portion of arm 41 which forms the outer surface 42, projects above base 3 and down to underneath the small plates 20. That portion of arm 41 bears underneath the small plates 20 a projection 60 the upper surface 61 of which forms a very obtuse angle with the higher-lying portion of surface 42, and the lower surface 62 of which forms an angle of approximately 90° with a lower-lying portion of surface 42.

The lath 51 has a small plate 63 projecting backwards, which lies directly above the frontwards-projecting stud 49 from lath 45. A downwards swinging motion of lath 51 about hinge pin 50 thus necessarily goes together with a downwards swinging motion of lath 45 about hinge pin 44, as the small plate 63 presses on said stud 49.

That portion farthest away from pin 50 of lath 51 is shaped as a handle 64.

The above-described components take in the closed position of the yoke, the position as shown in FIG. 9, and in the open position of the yoke, the position as shown in FIG. 10.

In the open position of said yoke, the horizontal portion 57 of the control member 56 extends horizontally in front of the opening between the top parts 6 and 25 of the yoke legs. The substantially vertical portion 58 of the control member 56 engages then the lower surface 62 of projection 60. This retains the top parts 6 and 25 in the yoke opening position.

The animal entering the lying-and-standing station finds the yoke in the open position as shown in FIG. 10 and passes his head through the opening which is left free between the yoke legs 6–7 and 25–7, to eat from the crib. He pushes thereby with his neck against the substantially horizontal portion 57 of the control member 56, whereby a swinging motion is caused about pin 55. The small wheel 73 comes thereby beside the projection 60, so that the lath 51 may now hinge freely about pin 50. Said springs 48 and 54 may now exert their action freely on the laths 45 and 51, so that said laths may be pulled upwards relative to the top parts 6 and 25 about the pins 44 and 50, and through the small wheels 47 and 53, those portions lying above the pins of the top parts 6 and 25 are pushed away from one another, and consequently those portions lying below said pins 15 of the top parts 6 and 25 are brought closer. The lower parts 7 of the yoke legs are also brought closer thereby and the yoke reaches the closing position. In such closed position, the laths 45 and 51 have become horizontal or even lie somewhat above a horizontal position relative to those pins 44 and 50 they hinge about. If the animal should now try to push the arms 6 and 25 away from one another, this is prevented by the laths 45 and 51 which act as bolts.

As soon as the animal has brought the substantially horizontal portion 57 of the control member upwards enough for the small wheel 73 not be retained any more by the projection 60, the closing is caused automatically by the springs 48 and 54 as described hereinbefore. The animal thus brings by acting on the control member 56, the yoke from the open position as shown in FIG. 10, to the closed position as shown in FIG. 9.

When moving from the open position as shown in FIG. 10 to the closed position as shown in FIG. 9, the small wheel 73 of control member 56, once it has passed beyond projection 60 in the upwards direction, engages again the surface 42 of arm 41, which thus acts as guideway for said small wheel 73.

Consequently during the complete upwards movement, the position of the substantially horizontal portion 57 of control member 56 remains determined by guideway 42. The control member undergoes a limited swinging counterclockwise motion about pin 55 (as shown in FIGS. 9 and 10) in order that small wheel 73 might pass beyond projection 60, but undergoes a substantially equal swinging motion in the opposite direction once small wheel 73 has come beyond projection 60. The guideway 42 is such that arm 57 of the control member 56 remains substantially horizontal during the complete movement of the yoke.

To open the closed yoke again, an operator pulls with handle 64 the lath 51 downwards. The locking by laths 45 and 51 is thereby released, and simultaneously the lath 51 pulls against the action of springs 48 and 54, the upper end of top part 6 towards the upper end of top part 25. At the same time, the upper end of top part 25 moves automatically towards the upper end of top part 6 as the small plate 63 of lath 51 also pushes downwards the stud 49 of lath 45, during the downwards movexent of said plate.

Figure 11:
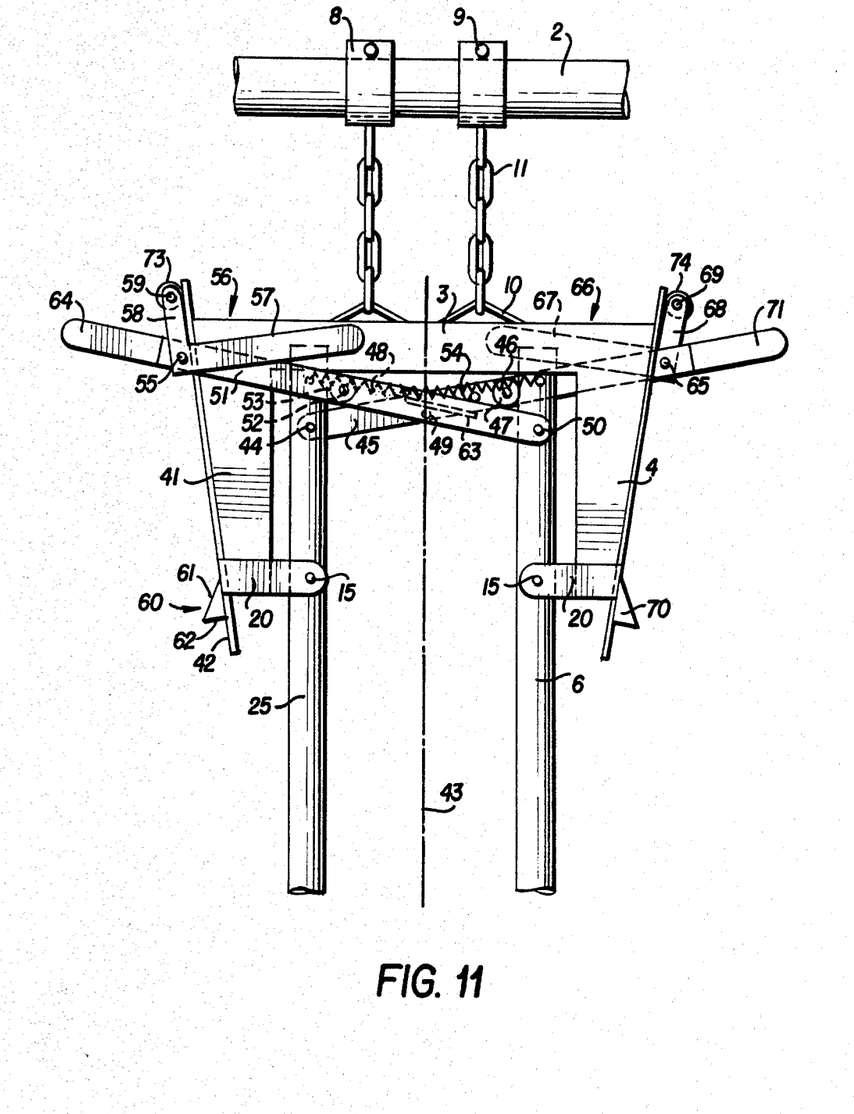
FIG. 11 is a front view of part of a third device for tying-up an animal according to the invention, whereby the yoke is shown in closed position.
Figure 12:
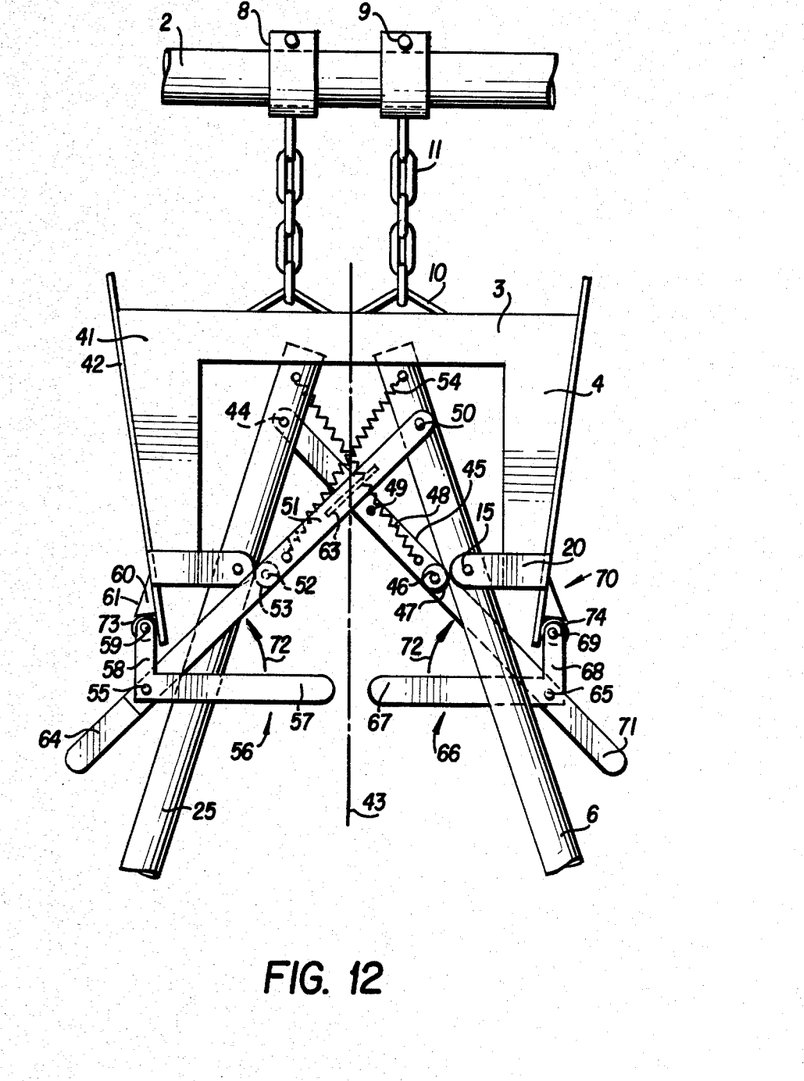
FIG. 12 is a front view of the part shown in FIG. 11, whereby the yoke is shown in open position.

The embodiment as shown in FIGS. 11 and 12 corresponds to the exception of the hereinafter-described features, with the embodiment as shown in FIGS. 9 and 10. The horizontal portion 57 of control member 56 which hinges about pin 55 which is fast to lath 51, extends however but to adjacent plane 43. The lath 45 is designed in a way similar to lath 51, but said lath 45 bears a pin 65 which is directed backwards. About said pin 65 hinges a second control member 66 with a substantially horizontal portion 67 and a substantially vertical portion 68. Said second control member 66 thus lies behind the yoke. The horizontal portion 67 of said second control member also extends nearly up to adjacent plane 43. At the top, the substantially-vertical portion 68 of the second control member 66 has a small shaft 69 projecting frontwards. A small wheel 74 lies around small shaft 69 and co-operates with a projection 70 from arm 4. Said projection 70 and arm 4 itself are symmetrical relative to plane 43, with projection 60 and arm 41. The arm 4 has thus also a surface 42 which guides the small wheel 74 during the closing of the yoke. The lath 45 also has in this embodiment a handle 71.

The working of the device as shown in FIGS. 11 and 12 does not differ essentially from the working of the device as shown in FIGS. 9 and 10, with the understanding however that in the yoke open position, two control members 56 and 66 have to be moved by the animal from the rest position as shown in FIG. 12. Although also in this embodiment, the animal pushes upwards the substantially horizontal portions 57 and 67 of the control members 56 and 66, it is however to be noted that said control members perform essentially swinging motions about the pins 55 and 65, so that the opening is also obtained due to the animal imparting to a control member a movement along the direction of arrows 72. The control members undergo thereby a motion with a component along the cross-wise direction of the yoke and the lying-and-standing station, and actually in the outwards direction. It is also important that in the embodiment as shown in FIGS. 11 and 12, the opening may be caused as well with handle 64 as with handle 71, that is from both yoke sides which contributes with a particular arrangement of the animals in the stalls, to the safety of the operator who opens the device.

The invention is in no way limited to the above-described forms of embodixent and within the scope of the patent application, many changes may be brought to the described forms of embodiment, notably as regards the shape, the composition, the arrangement, and the number of the components being used for embodying the invention.

Even if the suspension of the device has been described with the control yoke on the front side, that is on the crib side, the device may also be hung with the control yoke on the back side. As to pass from the open position to the closed position, the control yoke finally has to be raised, the device may also work when it is hung with the control yoke towards the back.

The bottom piece may be limited to a hinge between both lower parts of the yoke legs.

Various components may be adjustable along the cross-wise direction of the yoke, because the yoke should be usable for animals who have a different width. For example, the suspension element base may be comprised of two parts which may be secured to one another in different ways, which makes the spacing between the suspension element arms adjustable. The connecting tube of the control yoke also may be in two parts, with a possibility for various fastenings together of both parts. The top parts of the yoke legs may also be comprised at the top of various pieces which may be fastened in various ways, so that the spacing between the yoke legs in closed position is changed. The bottom piece of the yoke may also be made from two parts.

I claim:

1. A device for tying up an animal comprising:
   a suspension element comprised of
     a base to be hung from a fixed structure and
     two arms having upper ends fixed to said base and lower ends,
     said base and said arms defining a plane,
   a bottom piece to be connected to the fixed structure,
   first pins supported by said arms adjacent to said lower ends, at right angle to said plane,
   two legs forming together with the bottom piece one yoke, each of said legs being comprised of
     a top part,
     a lower part,
     a first hinge connecting the top part to the lower part, and
     a second hinge connecting the lower part to the bottom piece,
     each of said top parts hinging about one of said first pins and having a portion projecting above the first pin and a portion projecting under the first pin, said first hinges and said second hinges allowing a movement of said lower parts as well in said plane as outside said plane,
   second pins supported by said arms parallel to said plane,
   a control member comprised of
     a base, and
     two arms,
       said arms of said control member having ends fixed to said base of said control member and ends hinging about said second pins, the control member thus hinging about said second pins with respect to said suspension element between a first position in which the base of the control member is lower than said second pins and a second position in which the base of the control member is higher than said second pins, said control member acting on said portions of said top parts projecting above said first pins and retaining in its first position said portions projecting above said first pins in a converging position and retaining in its second position said portions projecting above said first pins in a parallel position, and
   a spring having two ends, one of said ends being connected to the control member and the other of said ends being connected to the suspension element, said spring passing through a dead position when the control member moves from its first position to its second position and pulling on one side of the dead position the control member to the first position and pulling on the other side of the dead position the control member to the second position.

2. The device of claim 1, in which the first pins are supported on the sides of the arms of the suspension element which face the other arm.

3. The device of claim 1, in which the base of the suspension element forms a downwardly directed channel in which uppermost ends of the portions of the top parts projecting above said first pins project.

4. The device of claim 1, in which the arms of the control member bear bosses engaging the portions of the top parts projecting above said first pins thus acting on said portions of the top parts projecting above said first pins in order to retain these portions in a converging position when the control member is in its first position and in a parallel position when the control member is in its second position.

5. The device of claim 1, in which said spring has a geometrical axis which in the first position of the control member passes below a geometrical axis of the second pins and which in the second position of the control member passes above the geometrical axis of the second pins, the geometrical axis of the spring intersecting the geometrical axis of the second pins when said spring is in its dead position.

6. The device of claim 1, which comprises:
a lath having two ends hinging with a first of said ends relative to the portion of a first of said top parts projecting above a first pin and engaging with a second of said ends the portion of a second of said top parts projecting above a first pin,
a spring connecting said second end of said lath to a point situated above said first end on said portion of said first top part, and
a mechanical connection between said control member and said lath bringing said second end downwards when said control member moves from its second position to its first position, said lath thus locking said top parts when its second end is higher than its first end and unlocking said top parts when its second end is lower than its first end.

7. A device for tying up an animal comprising:
a suspension element comprised of
a base to be hung from a fixed structure and
two arms having upper ends fixed to said base and lower ends,
said base and said arms defining a plane,
a bottom piece to be connected to the fixed structure,
first pins supported by said arms at right angle to said plane,
two legs forming together with the bottom piece one yoke, each of said legs being comprised of
a top part,
a lower part,
a first hinge connecting the top part to the lower part, and
a second hinge connecting the lower part to the bottom piece,
each of said top parts hinging about one of said first pins and having a portion projection under the first pin, said first hinges and said second hinges allowing a movement of said lower parts as well in said plane as outside said plane,
second pins supported by said arms parallel to said plane,
a control member comprised of
a base and
two arms,
said arms of said control member having ends fixed to said base of said control member and ends hinging about said second pins, the control member thus hinging about said second pins with respect to said suspension element between a first position in which the base of the control member is lower than said second pins and a second position in which the base of the control member is higher than said second pins, said control member acting on said top parts and retaining in its first position said portions projecting under said first pins in a diverging position and retaining in its second position said portions projecting under said first pins in a parallel position, and
a spring having two ends, one of said ends being connected to the control member and the other of said ends being connected to the suspension element, said spring passing through a dead position when the control member moves from its first position to its second position and pulling on one side of the dead position the control member to the first position and pulling on the other side of the dead position the control member to the second position.

* * * * *

UNITED STATES PATENT AND TRADEMARK OFFICE
CERTIFICATE OF CORRECTION

PATENT NO.   :   4,534,318
DATED        :   August 13, 1985
INVENTOR(S)  :   Noel VANDEVELDE It is certified that error appears in the above-identified patent and that said Letters Patent is hereby corrected as shown below:

Title page, below "[75] Inventor" information should appear:

-- [73] Assignee:   Christiaan Adriaan Corneel VANDEKEYBUS, Essen, Belgium --

Signed and Sealed this

Twenty-sixth Day of November 1985

[SEAL]

Attest:

Attesting Officer

DONALD J. QUIGG

Commissioner of Patents and Trademarks